United States Patent
Kurian et al.

(10) Patent No.: US 12,541,652 B2
(45) Date of Patent: Feb. 3, 2026

(54) CHATBOT WITH DYNAMICALLY CUSTOMIZED AI PERSONA

(71) Applicant: Bank of America Corporation, Charlotte, NC (US)

(72) Inventors: Manu Kurian, Dallas, TX (US); Vinesh Patel, London (GB)

(73) Assignee: Bank of America Corporation, Charlotte, NC (US)

( * ) Notice: Subject to any disclaimer, the term of this patent is extended or adjusted under 35 U.S.C. 154(b) by 236 days.

(21) Appl. No.: 18/598,092

(22) Filed: Mar. 7, 2024

(65) Prior Publication Data

US 2025/0284892 A1    Sep. 11, 2025

(51) Int. Cl.
*G06F 40/35* (2020.01)
*G06F 21/31* (2013.01)
*G06F 40/279* (2020.01)
*G06N 3/006* (2023.01)
*H04L 51/02* (2022.01)

(52) U.S. Cl.
CPC ............ *G06F 40/35* (2020.01); *G06F 21/31* (2013.01); *G06F 40/279* (2020.01); *G06N 3/006* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 12,231,377 B1* | 2/2025 | Saurabh | G06F 40/30 |
| 2008/0096533 A1* | 4/2008 | Manfredi | G06N 3/006 |
| | | | 455/412.1 |
| 2014/0359439 A1* | 12/2014 | Lyren | G06F 16/9538 |
| | | | 707/706 |
| 2016/0119477 A1* | 4/2016 | Sharpe | G06Q 30/0261 |
| | | | 379/265.09 |
| 2017/0185919 A1* | 6/2017 | Chawla | G06N 5/043 |
| 2018/0133900 A1* | 5/2018 | Breazeal | B25J 19/026 |
| 2019/0205727 A1* | 7/2019 | Lin | G06Q 40/04 |
| 2019/0354594 A1* | 11/2019 | Foster | G06N 3/0475 |
| 2020/0285705 A1* | 9/2020 | Zheng | G06F 40/30 |
| 2022/0051071 A1* | 2/2022 | Prayaga | G10L 15/22 |
| 2022/0129556 A1* | 4/2022 | Chen | G06F 21/74 |
| 2022/0164544 A1* | 5/2022 | Shimizu | G06Q 50/10 |
| 2022/0179888 A1* | 6/2022 | Wang | G06F 16/338 |

(Continued)

*Primary Examiner* — Douglas Godbold
(74) *Attorney, Agent, or Firm* — Weiss & Arons LLP

(57) ABSTRACT

An AI chatbot having a dynamic and customizable AI persona for interacting with a user of an entity is provided. The AI persona may include a plurality of customizable user-interaction characteristics including an AI persona tonality, an AI persona response time and an AI persona formality level. The AI chatbot may be configured to receive a request from a user device to interact with the AI chatbot. Prior to initiating an interaction, a processor of the AI chatbot may be configured to modify a default state of the AI persona to an initial customized state by adjusting each of the characteristic types included in each of the customizable user-interaction characteristics based on an analysis of a user profile of the user. During a duration of the interaction, the processor may be configured to monitor the interaction and dynamically toggle the characteristics of the AI persona based on user input.

20 Claims, 4 Drawing Sheets

(56) References Cited

U.S. PATENT DOCUMENTS

| | | | |
|---|---|---|---|
| 2022/0200934 A1* | 6/2022 | Dutta | G06N 3/0475 |
| 2024/0087597 A1* | 3/2024 | Byun | G10L 25/63 |
| 2024/0202584 A1* | 6/2024 | Schillace | G06N 20/00 |
| 2024/0291779 A1* | 8/2024 | Catalano | H04L 51/52 |
| 2024/0420688 A1* | 12/2024 | Manotas Gutiérrez | G10L 15/1815 |
| 2025/0265442 A1* | 8/2025 | Brown | G06N 3/006 |

\* cited by examiner

CHATBOT WITH DYNAMICALLY CUSTOMIZED AI PERSONA

FIELD OF TECHNOLOGY

Aspects of the disclosure relate to generating an artificial intelligence ("AI") chatbot with a customized persona for each user.

BACKGROUND OF THE DISCLOSURE

Artificial intelligence is used to run interactive voice and text response systems. These automated response systems are used to interact with a user and provide responses to the user's inquiries.

The mannerisms and response times of the automated responses generated by the AI is pre-defined. The AI system has a single one-size-fits-all approach for each user of the voice/text response system. This is not desirable at least because different individuals interacting with the automated agent may respond better to an automated agent with differing characteristics. For example, a first individual may desire longer response times and more wordy responses, whereas a second individual may respond better to quick paced responses and more targeted data.

Therefore, it would be desirable to provide an AI system that customizes the voice/text response system to the needs of each user interacting with it. It would be further desirable to provide an AI system that continues to learn during the customer interaction and, when need be, further change characteristics of the AI system to better service the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
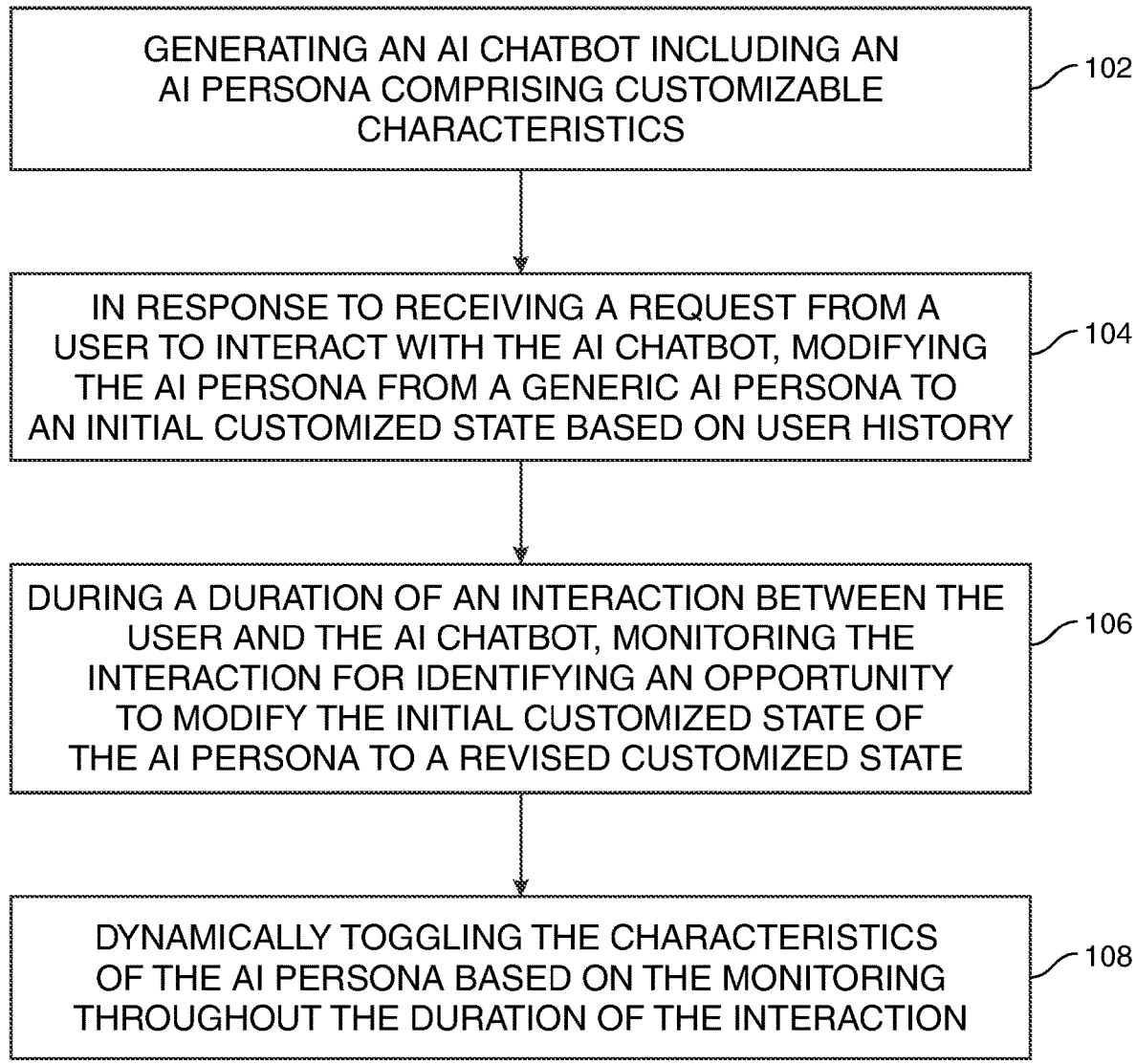
FIG. 1 shows an illustrative flow chart in accordance with principles of the disclosure.

A method for generating an artificial intelligence ("AI") chatbot having a customized AI persona for a user of an entity is provided. The AI chatbot may be associated with an entity. The entity may include a company, building, website, service, an application, an individual, and other entities.

The AI persona may include dynamically personalized characteristics associated with the interactions between the AI chatbot and the users of the chatbot. The AI persona of the AI chatbot may be dynamically altered for each user of the entity.

The method may include generating the AI persona for the AI chatbot for interacting with a user. The AI persona may include customizable user-interaction characteristics. The customizable user-interaction characteristics may include an AI persona tonality. The AI persona tonality may be the tone of the responses from the AI persona to the user. The tone may be via text. The tone may be via voice. The tonality may include a plurality of tonality types. The plurality of tonality types may include a calm tone, a matter-of-fact tone, a rough tone, an apologetic tone or any other suitable tone that may be used in interactive voice and text response systems.

The customizable user-interaction characteristics may include an AI persona response time. The AI persona response time may include a speed at which responses are delivered to the user. An exemplary speed may be a number of words per minute. The AI persona response time may include a time lapse between receipt of a user input and the providing of a response, by the AI chatbot, to the user. The response time may be toggled between two, three, or more pre-determined response times, such as an average speed, a below average speed and an above average speed. The response times may vary continuously based on the determined needs of the user.

The customizable user-interaction characteristics may include an AI persona formality level. The AI persona formality level may include a friendly communication, an official communication, a humorous communication, a legal communication or any other suitable formality level.

The AI persona may include customizable user-interaction characteristics set to a default state prior to communicating with a user. In some embodiments, the default state may be the most commonly used characteristic types for each of the customizable user-interaction characteristics.

The method may include receiving a request from a user to interact with the AI chatbot.

In response to receipt of the request, the method may include modifying the AI persona of the AI chatbot from the default state to an initial customized state. The modifying may be performed by selecting, from a plurality of characteristic types, a characteristic type for each of the AI persona tonality, the AI persona response time, and the AI persona formality level that may be most suitable to the user.

The selecting may include analyzing user data associated with the user. The user data may include a user age, a preferred language of the user, and a user profile.

The method may further include selecting an initial characteristic type for each of the customizable user-interaction characteristics based on the analyzed user data. For example, when the user age is above a predetermined age, the speed of the response and the tonality of the response may differ from a user where the user age is below the predetermined age.

Additionally, the initial characteristic types may differ depending on the preferred language of the user.

The user profile may include user behavior characteristics associated with previous interactions with the AI chatbot. The user profile may include pre-set preferences selected by the user for interacting with the AI chatbot.

The method may include initiating an interaction between the user and the AI chatbot once the AI persona of the AI chatbot is in the initial customized state.

The method may include during a duration of the interaction, performing, in parallel, a first monitoring routine, a second monitoring routine and a third monitoring routine. Each of the first monitoring routine, the second monitoring routine and the third monitoring routine may be for identifying an opportunity to modify the initial customized state of the AI persona to a revised customized state. The performing may be in real-time throughout the duration of the interaction.

In some embodiments, the method may include using natural language processing for deciphering the user input to determine whether the AI persona characteristics need modification. Natural language processing may enable identifying the sentiment of the user and the satisfaction of the user based on the user input.

The first monitoring routine may include monitoring a tone of user input. The monitoring of the tone of the user may be for identifying a tone that is outside a range of predicted tones. In a text chatbot, the tone may be outside the range of predicted tones when the text is not clear, words of frustration or unclarity are being expressed, or any other suitable tone.

In response to a determination that the tone of the user input is outside the range of predicted tones, the method may include adjusting the initial customized state of the AI tonality to a revised customized state of the AI tonality.

For example, when the user is communicating with the AI chatbot via text and the user is expressing a lack of clarity, the AI chatbot may determine to change the tonality of the AI persona to express any apologies and further to clarify the user's request by using more simple, clear and detailed wording and instructions.

The second monitoring routine may include monitoring a speed of user input received by the AI persona. The speed of user input may be a calculated speed, per minute, for which voice or text input is received from the user. The monitoring of the speed may be for detecting a speed of user input that is outside a range of predicted, or normal, user input speeds.

In response to a determination that the speed of the user input is outside the range of predicted speeds, the method may include adjusting the initial customized state of the AI response time to a revised customized state of the AI response time. For example, if the speed is slower than the range of predicted speeds, the revised customized state of the AI response time may be a slower AI response time. If the speed is faster than the range of predicted speeds, the revised customized state of the AI response time may be a faster AI response time. Slower/faster response times may be slower/faster relative to the initial customized AI response time.

The third monitoring routine may include monitoring text included in the user input. The monitoring of the text included in the user input may be for identifying text that may include one or more predetermined keywords. The predetermined keywords may include words that express anger, words that include a request for access to a live agent, or words that express any other predefined sentiment.

In response to identifying the one or more predetermined keywords, the method may include adjusting the initial customized state of the AI formality level to a revised customized state of the AI formality level.

At a time of termination of the interaction, the method may include storing the characteristic type for each of the AI persona tonality, the AI persona response time, and the AI persona formality level associated with the AI persona at the time of termination.

In addition to storing the characteristic type for each of the characteristics, the method may include associating a positive tag or a negative tag with each of the characteristic types.

In some embodiments, the request from the user may be a first request and the method may include receiving a second request from the user. In response to receiving the second request, the method may include modifying the AI persona of the AI chatbot for responding to the second request by selecting the characteristic types stored at the time of the termination for being applied to the AI persona.

In some embodiments, the method may include displaying a pop-up notification during the interaction in order to receive a user rating of the interaction of the AI chatbot. This may be displayed in parallel to the monitoring of the user interaction. In some embodiments, the pop-up notifications may be displayed in place of the monitoring. The pop-up notification may include selectable options for rating each of the customizable user-interaction characteristics of the AI persona. Based on the ratings selected by the user, the method may include modifying the characteristic types for each of the customizable user-interaction characteristics of the AI persona.

When the user selected rating differs from an outcome of the first monitoring, second monitoring, and/or third monitoring, the method may include overwriting the outcome of the monitoring and modifying the AI persona based on the user selected rating.

It should be appreciated that at each initiation of a user interaction with the AI persona, the method may include generating the AI persona to an initial customized state for each user. When the user is initiating a user interaction for a second, third, fourth or any other suitable time, the method may include retrieving the characteristic types stored for each characteristic and modifying the AI persona to include the stored characteristics.

It should be appreciated that the AI persona and all the customizable user-interaction characteristics may be stored in a database run using quantum computing.

An AI chatbot that includes a dynamically customizable AI persona for interacting with a user is provided. The AI persona may be customizable for each user. The AI persona may include a plurality of customizable user-interaction characteristics. The plurality of customizable user-interaction characteristics may include an AI persona tonality, an AI persona response time and an AI persona formality level. The customizable user-interaction characteristics may include any other additional suitable characteristics.

The AI chatbot may include a receiver configured to receive a request from a user to interact with the AI chatbot.

The AI chatbot may include a processor configured to execute the AI persona of the AI chatbot from a default state to an initial state for responding to the request by modifying the default state of the AI persona to an initial customized state.

The modifying may be performed by the processor. The modifying may include selecting, from a plurality of characteristic types, a characteristic type for each of the AI persona tonality, the AI persona response time, and the AI persona formality level.

The processor may leverage a data analytics module to analyze user data from a database. The database may be stored at an entity server. The processor may be in electronic communication with the entity server.

The user data may include a user age, a preferred language of the user, and a description of the user.

Based on the analyzing, the processor may be configured to select an initial characteristic type for each of the customizable user-interaction characteristics.

The processor may be further configured to initiate an interaction between the user and the AI chatbot. The interaction may occur on a user interface on a device of the user. The user may operate the user interface by opening an application (or, e.g., a browser tab or location) and initiating a conversation with the chatbot through the user interface. The user may request a service, have a question, or begin a conversation. In various embodiments, the user may interact with the user interface through a mouse and keyboard, a touchscreen, through a video camera, through a microphone, or through any other suitable input method.

When the user operates the user interface on the user device, a device authentication program may transmit an authentication request to an authentication engine running on the entity server. The transmission may be over a communication link connected to a network, such as the Internet, or an internal network. The authentication request may include a username and password, or other identifying data (such as a MAC address of the user device) that may be used to authenticate the user. The authentication engine may receive the authentication request.

The authentication engine may evaluate the authentication request and determine whether to authenticate the user or deny authentication. Any standard authentication method may be used.

The AI chatbot may display responses within the user interface. The AI persona of the AI chatbot may be in the initial customized state.

The processor may be further configured to, during a duration of the interaction, perform in parallel a first monitoring routine, a second monitoring routine and a third monitoring routine. Each of the first monitoring routine, the second monitoring routine and the third monitoring routine, may enable identifying an opportunity to modify the initial customized state of the AI persona to a revised customized state.

The processor may be configured to perform the first monitoring routine by monitoring a tone of user input received by the AI chatbot for identifying a tone that is outside a range of predicted tones. In response to a determination that the tone of the user input is outside the range of predicted tones, the processor may be configured to adjust the initial customized state of the AI tonality to a revised customized state of the AI tonality.

The processor may be configured to perform the second monitoring routine by monitoring a speed of user input received by the AI persona for detecting a speed that is outside a range of predicted speeds. In response to a determination that the speed of the user input is outside the range of predicted speeds, the processor may be configured to adjust the initial customized state of the AI response time to a revised customized state of the AI response time.

The processor may be configured to perform the third monitoring routine by monitoring the words included in the user input for input of a one or more predetermined keywords.

In response to an identifying of the one or more predetermined keywords, the processor may be configured to adjust the initial customized state of the AI formality level to a revised customized state of the AI formality level.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative flow chart in accordance with principles of the disclosure. Methods may include some or all of the method steps numbered 102 through 108. Methods may include the steps illustrated in FIG. 1 in an order different from the illustrated order. The illustrative method shown in FIG. 1 may include one or more steps performed in other figures or described herein. Steps 102 through 108 may be performed on the apparatus shown in FIGS. 3-4, or other apparatus.

At step 102 an AI chatbot may be generated that may include an AI persona including customizable characteristics. The AI persona may be generated in a default state. The default state may include generating the AI persona with the most commonly used characteristic types for each of the customizable characteristics.

At step 104, in response to receiving a request from a user to interact with the AI persona, the AI persona may be modified from the default state to an initial customized state. The initial customized state may be based on user history associated with the chatbot. The initial customized state may be based on a user profile associated with the user.

At step 106, during a duration of an interaction between the user and the AI persona, the interaction may be monitored. The monitoring may be for identifying an opportunity to modify the initial customized state of the AI persona to a revised customized state.

At step 108, the characteristics of the AI persona may be dynamically toggled based on the monitoring throughout the duration of the interaction.

Figure 2:
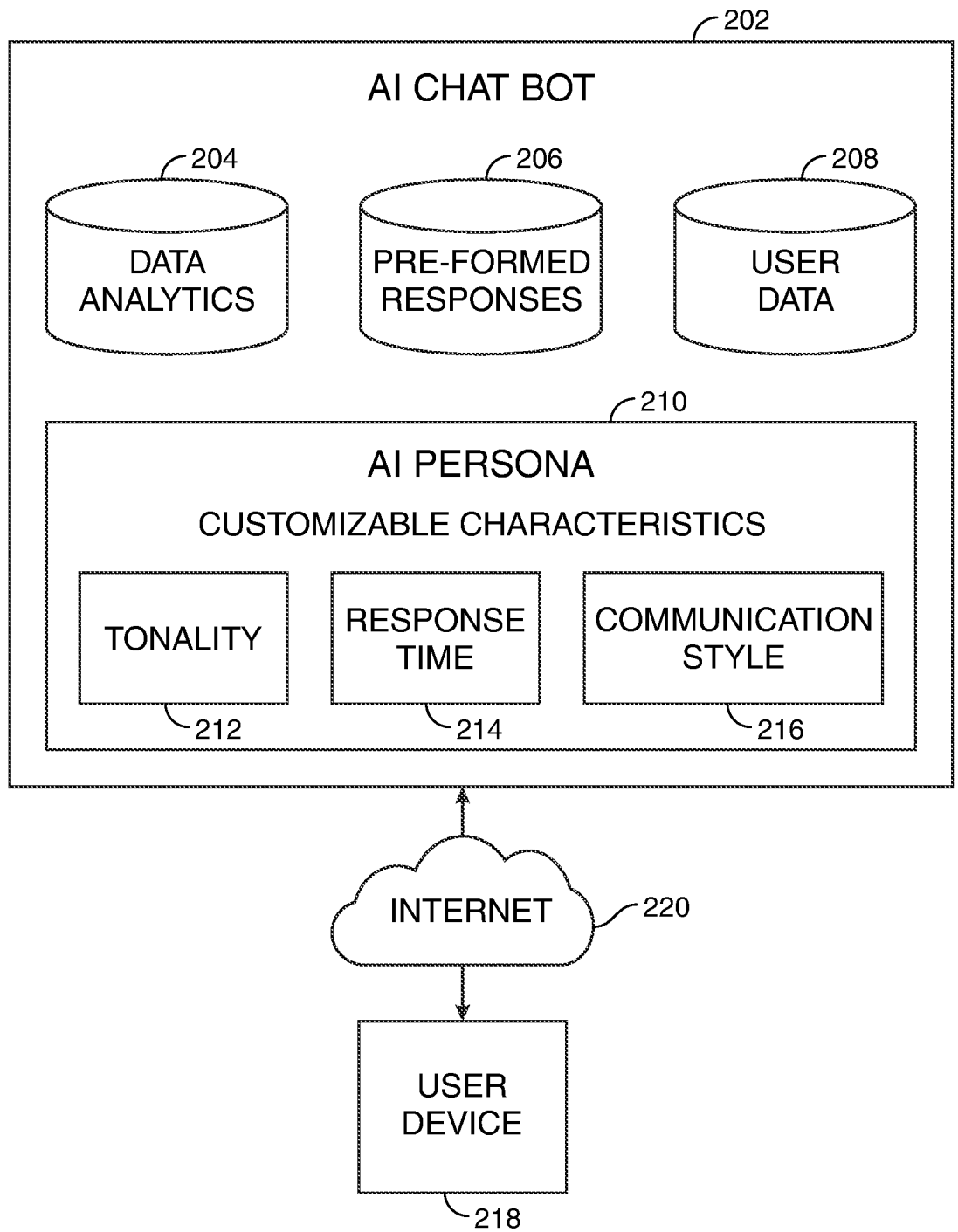
FIG. 2 shows an illustrative diagram in accordance with principles of the disclosure.

FIG. 2 shows an illustrative diagram of apparatus in accordance with principles of the disclosure.

AI chatbot 202 may be an automated chatbot that may be generated and hosted by an entity server. AI chatbot 202 may be trained using AI and ML for interacting with customers of the entity.

AI chatbot 202 may be configured for use on a user interface ("UI") of a user device 218. A user may communicate with AI chatbot 202 via the UI. The UI may be accessed via a web browser. The UI may be accessed via an APP downloaded onto the user's device. The communication may be enabled via internet 220.

AI chat persona 210 may be the dynamic characteristics that may be expressed by AI chatbot 202. AI chat persona 210 may include data analytics 204. AI chat persona 210 may include pre-formed responses 206. AI chat persona 210 may include user data 208.

Data analytics 204 may include large amounts of data that have been retrieved from previous chats and stored in a database at the entity server. The data may be used for analysis in order to enhance the ML and AI algorithms in generating the most accurate responses.

Pre-formed responses 206 may be responses generated by the ML and AI algorithms as output in a chat. The pre-formed responses 206 may be generated using training data from previous conversations.

User data 208 may be accessed for each user that may log in to access the chatbot. User data 208 may include a profile of the user and data gathered from each previous interaction with the AI chatbot 202 that may assist in providing the most accurate responses to the user.

AI chat persona 210 may include customizable characteristics that may be toggled for each user interacting with the AI chatbot 202. The customizable characteristics 210 may include a tonality 212, a response time 214 and a formality level 216. Each of the tonality 212, response time 214 and formality level 216 may include a plurality of types.

For each user interacting with the AI chatbot 202, the characteristics types may be toggled for providing a most optimal, tailor-made response to the user.

Figure 3:
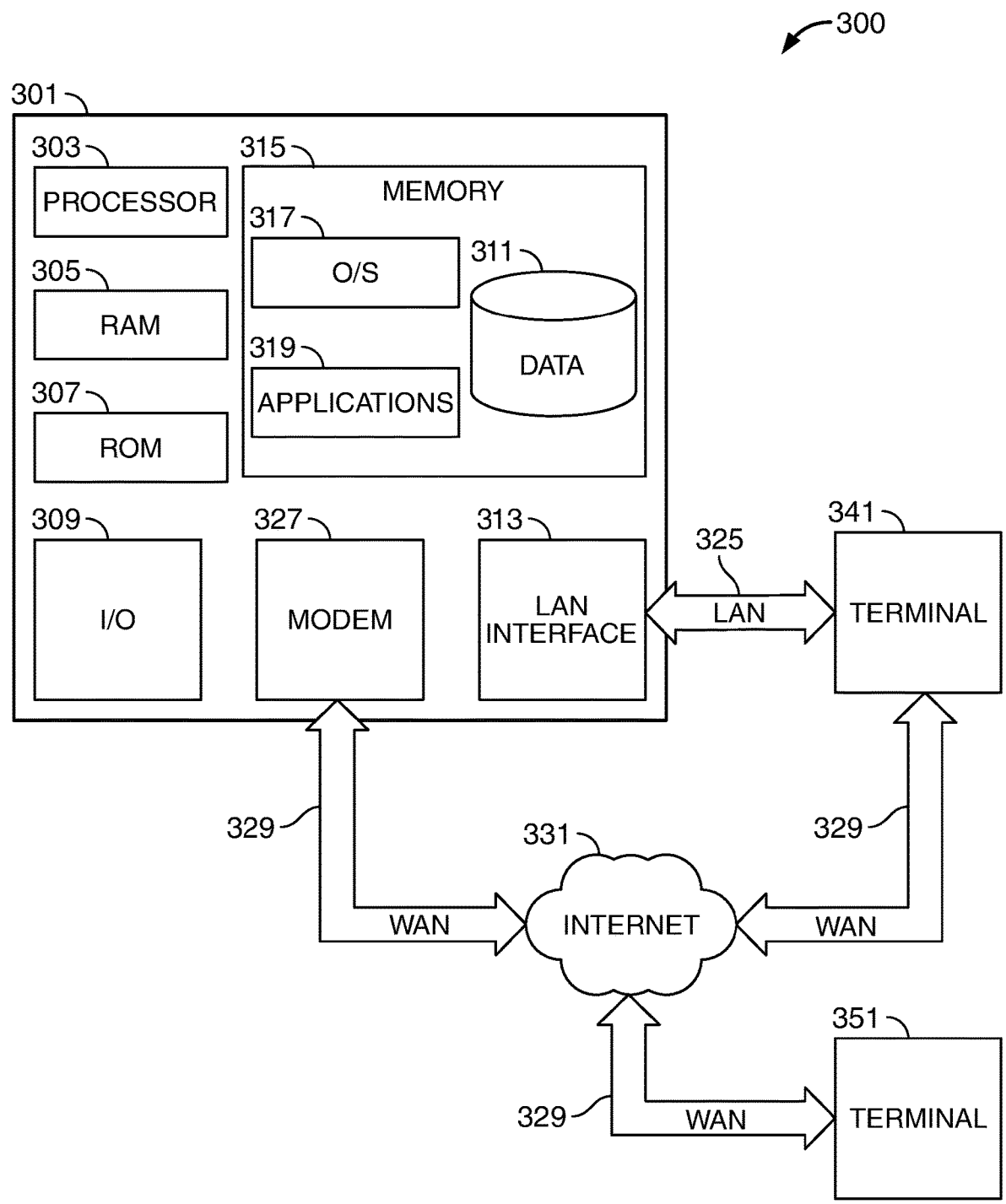
FIG. 3 shows an illustrative block diagram in accordance with principles of the disclosure.

FIG. 3 shows an illustrative block diagram of system 300 that includes computer 301. Computer 301 may alternatively be referred to herein as an "engine," "server" or a "computing device." The computing system may include one or more computer servers 301. Computer 301 may be any computing device described herein. Computer 301 may include the AI chatbot, the user device, the entity server and any other computing device described herein. Computer 301 may include the communications server. Elements of system 300, including computer 301, may be used to implement various aspects of the systems and methods disclosed herein.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. Other components commonly used for computers, such as EEPROM or Flash memory or any other suitable components, may also be part of the computer 301.

The memory 315 may be comprised of any suitable permanent storage technology—e.g., a hard drive. The memory 315 may store software including the operating system 317 and application(s) 319 along with any data 311 needed for the operation of computer 301. Memory 515 may also store videos, text, and/or audio assistance files. The data stored in Memory 315 may also be stored in cache memory, or any other suitable memory.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

Computer 301 may be connected to other systems via a local area network (LAN) interface 313. Computer 301 may operate in a networked environment supporting connections to one or more remote computers, such as terminals 341 and 351. Terminals 341 and 351 may be personal computers or servers that include many or all of the elements described above relative to computer 301.

When used in a LAN networking environment, computer 301 is connected to LAN 325 through a LAN interface 313 or an adapter. When used in a WAN networking environment, computer 301 may include an environment 327 or other means for establishing communications over WAN 329, such as Internet 331.

In some embodiments, computer 301 may be connected to one or more other systems via a short-range communication network (not shown). In these embodiments, computer 301 may communicate with one or more other terminals 341 and 351, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may include any one or more of the applications embedded within the AI chatbot, the user device and/or the entity server, and instructions and algorithms associated with and/or embedded within the AI chatbot, the user device and the entity server.

Application program(s) 319 may include computer executable instructions (alternatively referred to as "programs"). The computer executable instructions may be embodied in hardware or firmware (not shown). The computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 319 may include one or more algorithms that may be used to implement features of the disclosure.

The invention may be described in the context of computer-executable instructions, such as applications 319, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 541 may be one or more user devices. Terminals 351 and 341 may be identical to computer 301 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 4:
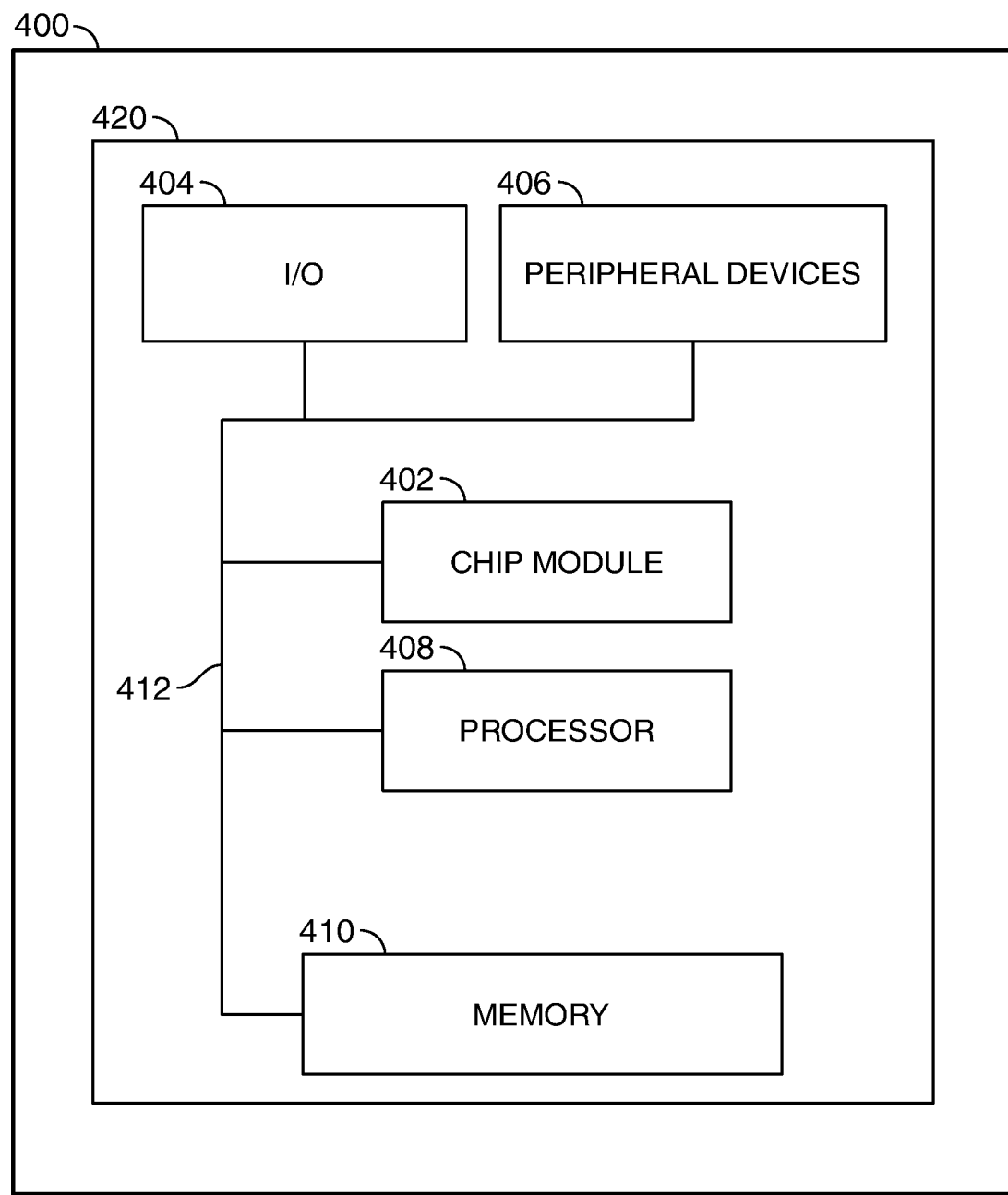
FIG. 4 shows an illustrative apparatus that may be configured in accordance with principles of the disclosure.

FIG. 4 shows illustrative apparatus 400 that may be configured in accordance with the principles of the disclosure. Apparatus 400 may be a computing device. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data, and machine-readable memory 410.

Machine-readable memory 410 may be configured to store in machine-readable data structures: machine executable instructions, (which may be alternatively referred to herein as "computer instructions" or "computer code"), applications such as applications 419, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

Thus, systems and methods for generating an AI chatbot having a customized AI persona is provided. Persons skilled in the art will appreciate that the present invention can be practiced by other than the described embodiments, which are presented for purposes of illustration rather than of limitation.

What is claimed is:

1. A method for generating an artificial intelligence ("AI") chatbot having an AI persona customized for a user of an entity, the method comprising:
   generating the AI persona for the AI chatbot, the AI persona having customizable user-interaction characteristics that include:
      an AI persona tonality;
      an AI persona response time; and
      an AI persona formality level;
   receiving a request from the user to interact with the AI chatbot;
   in response to receipt of the request, modifying the AI persona of the AI chatbot from a default state to an initial customized state by selecting, from a plurality of characteristic types, a characteristic type for each of the AI persona tonality, the AI persona response time, and the AI persona formality level, wherein the selecting comprises:
      analyzing user data, the user data including a user age, a preferred language of the user, and a user profile; and
      selecting an initial characteristic type for each of the customizable user-interaction characteristics based on the analyzing of the user data;
   initiating an interaction between the user and the AI chatbot, the AI persona of the AI chatbot being in the initial customized state; and
   during a duration of the interaction, in real-time, performing, in parallel, a first monitoring routine, a second monitoring routine and a third monitoring routine, each of the first monitoring routine, the second monitoring routine and the third monitoring routine for identifying an opportunity to modify the initial customized state of the AI persona to a revised customized state, wherein:
      the first monitoring routine comprises:
         monitoring a tone of user input for identifying a tone that is outside a range of predicted tones; and
         in response to a determination that the tone of the user input is outside the range of predicted tones, adjusting the initial customized state of the AI tonality to a revised customized state of the AI tonality;
      the second monitoring routine comprises:
         monitoring a speed of user input for detecting a speed that is outside a range of predicted speeds; and
         in response to a determination that the speed of the user input is outside the range of predicted speeds, adjusting the initial customized state of the AI response time to a revised customized state of the AI response time; and
      the third monitoring routine comprises:
         monitoring text included in the user input for text including one or more predetermined keywords; and
         in response to an identifying of one or more predetermined keywords, adjusting the initial customized state of the AI formality level to a revised customized state of the AI formality level.

2. The method of claim 1 further comprising storing the characteristic type for each of the AI persona tonality, the AI persona response time, and the AI persona formality level associated with the AI persona at a time of termination of the interaction.

3. The method of claim 2 further comprising associating a positive tag or a negative tag with each of the characteristic types.

4. The method of claim 3 wherein the request is a first request, and the method further comprises receiving a second request from the user.

5. The method of claim 4 further comprising, in response to receiving the second request, modifying the AI persona of the AI chatbot prior to responding to the second request by selecting the characteristic types stored at the time of the termination.

6. The method of claim 1 wherein the interaction is via a texting chatbot.

7. The method of claim 6 further comprising, during the interaction, displaying a pop-up notification comprising selectable options for rating each of the customizable user-interaction characteristics of the AI persona.

8. The method of claim 7 further comprising, in response to a receipt of a negative rating, modifying the initial customized state of the AI persona to the revised customized state.

9. The method of claim 1 wherein the interaction is via an interactive voice response ("IVR") system.

10. The method of claim 1 wherein the interaction between the user and the AI chatbot is displayed on a user interface on a user device.

11. A method for generating an artificial intelligence ("AI") chatbot having a persona customized for a user of an entity, the method comprising:
generating an AI persona for the AI chatbot, the AI persona comprising customizable user-interaction characteristics that include:
a AI persona tonality;
a AI persona response time; and
a AI persona formality level;
receiving a first request from the user to interact with the AI chatbot;
in response to receipt of the first request, modifying the AI persona of the AI chatbot from a default state to an initial customized state by selecting, from a plurality of characteristic types, a characteristic type for each of the AI persona tonality, AI persona response time and AI persona formality level, wherein the selecting comprises:
analyzing user data, the user data comprising: a user age, a preferred language of the user, and a user profile; and
selecting an initial characteristic type for each of the customizable user-interaction characteristics based on the analyzing of the user data;
initiating an interaction between the user and the AI persona, the AI persona being in the initial customized state;
during a duration of the interaction, performing, in parallel, a first monitoring routine, a second monitoring routine and a third monitoring routine, each of the first monitoring routine, the second monitoring routine and the third monitoring routine, for identifying an opportunity to modify the initial customized state of the AI persona to a revised customized state, wherein:

the first monitoring routine comprises:
monitoring a tone of user input for identifying a tone that is outside a range of predicted tones; and
in response to a determination that the tone of the user input is outside the range of predicted tones, adjusting the initial customized state of the AI tonality to a revised customized state of the AI tonality;
the second monitoring routine comprises:
monitoring a speed of user input for detecting a speed that is outside a range of predicted speeds; and
in response to a determination that the speed of the user input is outside the range of predicted speeds, adjusting the initial customized state of the AI response time to a revised customized state of the AI response time; and
the third monitoring routine comprises:
monitoring text included in the user input for input of a one or more predetermined keywords; and
in response to an identifying of the one or more predetermined keywords, adjusting the initial customized state of the AI formality level to a revised customized state of the AI formality level;
at a time of termination of the interaction, storing the characteristic type set for each of the customizable user-interaction characteristics at the time of the termination;
receiving a second request from the user to interact with the AI chatbot; and
automatically modifying the default state of the AI persona to the revised customized state at the time of the termination.

12. The method of claim 11 further comprising, during the interaction following a receipt of the second request, continuously performing the first monitoring routine, the second monitoring routine and the third monitoring routine.

13. The method of claim 11 wherein the interaction is via a texting chatbot.

14. The method of claim 11 wherein the interaction is via an interactive voice response ("IVR") system.

15. An artificial intelligence ("AI") chatbot having a dynamic AI persona for interacting with a user of an entity, the AI persona customizable for the user, the AI chatbot comprising:
the AI persona comprising a plurality of customizable user-interaction characteristics, the plurality of customizable user-interaction characteristics comprising:
an AI persona tonality;
an AI persona response time; and
an AI persona formality level;
a receiver configured to receive a request from a user device associated with the user to interact with the AI chatbot;
a processor configured to execute the AI chatbot to include the AI persona for responding to the request by modifying a default AI persona to an initial customized state by selecting, from a plurality of characteristic types, a characteristic type for each of the AI persona tonality, the AI persona response time, and the AI persona formality level, the selecting comprising:
using a data analytics module to analyze user data from a database, the database stored at an entity server, the processor in electronic communication with the entity server, the user data comprising: a user age, a preferred language of the user, and a user profile; and based on the analyzing, select an initial characteristic type for each of the customizable user-interaction characteristics; and the processor further configured to:
  initiate an interaction between the user and the AI chatbot wherein the AI persona of the AI chatbot being in the initial customized state; and
  during a duration of the interaction, perform, in parallel a first monitoring routine, a second monitoring routine and a third monitoring routine, each of the first monitoring routine, the second monitoring routine and the third monitoring routine, for identifying an opportunity to modify the initial customized state of the AI persona to a revised customized state, wherein:
    the first monitoring routine comprises:
      monitoring a tone of user input for identifying a tone that is outside a range of predicted tones; and
      in response to a determination that the tone of the user input is outside the range of predicted tones, adjusting the initial customized state of the AI tonality to a revised customized state of the AI tonality;
    the second monitoring routine comprises:
      monitoring a speed of user input for detecting a speed that is outside a range of predicted speeds; and
      in response to a determination that the speed of the user input is outside the range of predicted speeds, adjusting the initial customized state of the AI response time to a revised customized state of the AI response time; and
    the third monitoring routine comprises:
      monitoring text included in the user input for input of a one or more predetermined keywords; and
      in response to an identifying of the one or more predetermined keywords, adjusting the initial customized state of the AI formality level to a revised customized state of the AI formality level.

16. The AI chatbot of claim 15 wherein the processor is further configured to store the characteristic type for each of the AI persona tonality, the AI persona response time, and the AI persona formality level associated with the AI persona at a time of termination of the interaction.

17. The AI chatbot of claim 16 wherein the processor is further configured to associate a positive tag or a negative tag with each of the characteristic types.

18. The AI chatbot of claim 16 further comprising an authentication engine configured to evaluate an authentication request received via a user interface and determine whether to authenticate the user or deny authentication.

19. The AI chatbot of claim 16 wherein the user device is a smartphone.

20. The AI chatbot of claim 19 wherein the interaction on the user device is one of a voice chat or text chat.

* * * * *